3,585,230
STABLE LIQUID POLYISOCYANATE
COMPOSITIONS
Elias A. Woycheshin, Livermore, and Donald L. Scott, Hayward, Calif., assignors to Kaiser Aluminum & Chemical Corporation, Oakland, Calif.
No Drawing. Filed July 17, 1968, Ser. No. 745,409
Int. Cl. C07c *119/04;* C08g *22/44;* C08a *51/62*
U.S. Cl. 260—453
17 Claims

ABSTRACT OF THE DISCLOSURE

Liquid aromatic polyisocyanates are stabilized against crystallization and sediment formation at temperatures below their solidification point by the addition of a stabilizing amount of an organo-silicone.

BACKGROUND OF THE INVENTION

This invention is directed to the stabilization of liquid aromatic polyisocyanates at temperatures below the solidification point of the polyisocyanates. The stabilization is accomplished by admixing or dispersing a small amount of an organo-silicone in the liquid polyisocyanate. The combination of the polyisocyanates with the organo-silicone will retard or eliminate solids formation at temperatures below 25° C. and even at temperature of about −20° C.

Aromatic polyisocyanates are usually produced by the condensation of an aromatic amine with an aldehyde or ketone, in the presence of a strong Lewis acid, followed by phosgenation of the porduced condensate. Polyisocyanates are important in the preparation of coatings and adhesives, and they also serve as intermediates in the production of urethanes. Urethanes are frequently employed as foams and as such find widespread use in the field of insulation and cryogenics and in the packaging industry.

Polyisocyanates produced by phosgenation of condensed polyamines usually contain a substantial amount of dimers, e.g., the condensation product of two moles of aromatic amines linked by a methylene bridge and lesser quantities of higher polymers such as trimers, tetramers and pentamers, where three or more aromatic amines, form a polymeric product, linked by methylene bridges. During the condensation and phosgenation reaction, some side reactions occur, which produce polymeric products. These products have a tendency to settle or crystallize at temperatures at and below about 25° C. and the liquid polyisocyanate will contain sediments or crystals. This formation or sedimentation of solid particles causes several undesirable results, such as plugging of pipelines and stoppage of pumps; thus it hinders considerably the conveyance of polyisocyanates in pipelines. In some cases, the polyisocyanate at temperatures below about 25° C. solidifies and requires heating to render it liquid for transportation.

Liquid polyisocyanates containing solids or sediments are usually unsuitable for many purposes and removal of the solids prior to use is desirable. This is accomplished by either heating the polyisocyanate to temperatures at which the solids redissolve in the polyisocyanate or by filtration. Heating of the polyisocyanates can affect the quality, since it may result in undesirable decomposition or further polymerization. Fltration requires extensive equipment and also involves loss of material, which always accompanies filtration.

The problem of sediment or solids formation is particularly serious during the winter months, and several proposals have already been made to maintain liquid aromatic polyisocyanates free of solids formation. One of these proposals involves the addition of an immiscible organic silicone to isocyanates to provide a surface layer which will prevent oxidative degradation. The organic silicone in this process must be insoluble in the isocyanate to form the surface layer and does not provide protection against sediment formation due to decreased solubility at temperatures below about 25° C. It has also been suggested to employ 2-hydroxyphenoxy trimethyl silane to maintain isocyanates colorless during storage. However, the addition of this compound to polyisocyanates will not prevent solids formation at temperatures at and below room temperature.

It has now been found that, according to the process of the present invention, it is possible to eliminate or substantially reduce solids formation or sedimentation in aromatic polyisocyanates at temperatures from about 25° C. to about −20° C. and to produce a liquid polyisocyanate free of sediments or crystals at these temperatures.

BRIEF SUMMARY OF THE INVENTION

Liquid aromatic isocyanates are stabilized against solids formation or sedimentation at temperature from about 25° C. to about −20° C. by the admixture of a stabilizing amount of an organo-silicone having the general structure of

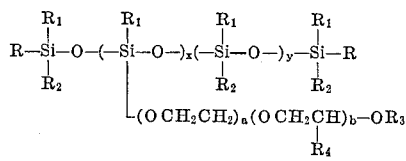

wherein R, $R_1$ and $R_2$ are either methyl, ethyl, propyl or phenyl groups, $R_3$ and $R_4$ are either hydrogen, methyl, ethyl, propyl or butyl groups and wherein the silicone chain has an average molecular weight of from about 140 to about 5000 and the polyether chain has an average molecular weight of from about 60 to about 3000. The integers $x$ and $y$ are whole numbers and at least 1, and $a$ and $b$ can be 0 or whole numbers, but one of them must be at least 1.

DETAILED DESCRIPTION OF THE INVENTION

Aromatic polyisocyanates, produced from the condensation of aromatic amines with an aldehyde or ketone in the presence of a Lewis acid and followed by phosgenation, are readily stabilized against solids formation or sedimentation at temperatures from about 25° C. to about −20° C. by the admixture with an organo-silicone of the general structure:

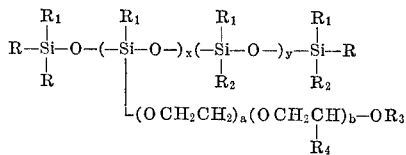

wherein R, $R_1$, and $R_2$ are selected from the group consisting of methyl, ethyl, propyl, and phenyl, $R_3$ and $R_4$ are selected from the group consisting of hydrogen, methyl, ethyl, propyl and butyl, and wherein the average molecular weight of the

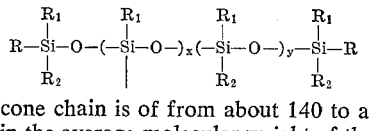

organo-silicone chain is of from about 140 to about 5000 and wherein the average molecular weight of the

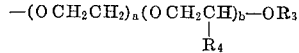

polyether chain is of from about 60 to about 3000, the integers $x$ and $y$ are whole numbers and at least 1, $a$ or $b$ can be either 0 or whole numbers, but one of said $a$ and $b$ must be at least 1. The term "liquid aromatic polyisocyanates" as used herein is intended to cover mixtures of polymeric NCO group containing compounds which are liquid at room temperature and have solidification or crystallization points below $-20°$ C. A typical example is polymethylene-polyphenylene polyisocyanate.

The stabilizing agents encompassed within the above general formula include those where all of the R, $R_1$, $R_2$, $R_3$ and $R_4$ groups are either methyl, ethyl, propyl, butyl or phenyl groups. $R_3$ and $R_4$ can also be hydrogen. However, any desired combination within the above general structure of the R constituents and the integers can be employed for the stabilizing action of the organo-silicone compound. For best results, the following organo-silicones are recommended: Polymethyl polysiloxane-polyethylene ether, polymethyl polysiloxane-polypropylene ether, polymethyl polysiloxane-polyethylene-polypropylene ether copolymer. Polyalkyl polysiloxane-polyoxyalkylene ethers or mixtures of polyalkyl polysiloxane-polyoxyalkylene ethers and polyaryl polysiloxane-polyoxyalkylene ethers of the present invention can be employed in amounts sufficient to stabilize the polyisocyanate against solids formation or sedimentation. The stabilizing amount at normal conditions and for temperatures from about 25° C. to about $-20°$ C. is suitably from about 0.001 to about 5% by weight of the polyisocyanates. It will be evident to persons skilled in the art that in case the temperature is lower than about $-20°$ C., addition of the stabilizer in amounts in excess of 5% by weight may be required to achieve stabilizing effect. Amounts in excess of 15% by weight of polyisocyanates may affect detrimentally the reactivity of the polyisocyanates. The amount of organo-silicone stabilizer to be added also varies with the average molecular weight of the stabilizer and the temperature at which the stabilization is required.

The organo-silicones of the present invention can be admixed with or dispersed in the liquid polyisocyanates. For best results the contact between the polyisocyanate and the stabilizing agent should be intimate to avoid accumulation of the stabilizer on the surface of the polyisocyanate. Intimate admixture of the stabilizer will facilitate contact with the polyisocyanate and will assure the stabilizing effect. This admixture can be accomplished by conventional means such as agitators, impellers or manual stirring.

As the amount of stabilizer added to the polyisocyanate is only a stabilizing amount, it will not adversely affect the reactivity or other properties of the isocyanates.

The invention is further illustrated by the following examples:

EXAMPLE I 100 grams of clear, liquid polymethylene polyphenylene polyisocyanate (equivalent weight 132, viscosity 220 centipoise at 25° C.) were admixed with a silicone-glycol copolymer having a viscosity of 496 centipoise at 25° C., an average molecular weight of 2092 determined by the vapor pressure method, a $—CH_2CH_2O—$ to $Si(CH_3)_2$ ratio of 4 determined by the NMR (nuclear magnetic resonance) method, a flash point of 204° C. as determined by the open cup flash point method, and available commercially as "Dow Corning 193 Surfactant" (1968). The admixture was maintained at $-17.8°$ C. for 12 days. After this period, the polyisocyanate was still clear with no crystal or sediment formation. A control sample of the above polyisocyanate without the stabilizer exhibited crystal formation after five days at $-17.8°$ C., and it contained approximately 30% by weight solids after the 12 day period.

EXAMPLE II 100 grams of clear, liquid polymethylene-polyphenylene polyisocyanate (equivalent weight 132, viscosity 200 centipoise at 25° C.) were admixed with 0.5 gram of an organo-silicone having an average molecular weight of 356 determined by the vapor pressure method, free hydroxyl groups (hydroxyl number approximately 160) and a $—CH_2CH_2O—$ to $Si(CH_3)_2$ ratio of 11. The viscosity of the organo-silicone was 42.7 centipoise at 25° C., and it possessed the following physical properties: flash point of about 121° C. by the open cup flash point method, freezing point of 15.5° C. This organo-silicone is commercially available and is sold as "Union Carbide L-5320 Surfactant" (1968). The admixture was maintained at $-17.8°$ C. for a 12-day period. During this time, no crystal formation was observed and no sedimentation occurred. The polyisocyanate remained clear and liquid. A control sample without the stabilizer exhibited crystals after a five day period and heavy sedimentation (more than 30%) after the 12-day storage period at $-17.8°$ C.

EXAMPLE III 100 grams of clear, liquid polymethylene-polyphenylene polyisocyanate (equivalent weight 130, viscosity 100 centipoise at 25° C.) was admixed with 0.1 gram "Dow Corning 193 Surfactant." The admixture was maintained at $-6.6°$ C. for 23 days. The stabilized polyisocyanate remained clear and no sedimentation was observed. In contrast, a control sample without the stabilizer began crystallization after one day, and the solids formation after 23 days was considerable (in excess of 50% by weight).

EXAMPLE IV

The process described in the foregoing example was repeated with 0.1 gram "Union Carbide L-5320 Surfactant." The stabilized sample remained clear, while the control sample devoid of stabilizer, exhibited crystal formation after 1 day at $-6.6°$ C. and at least 50% by weight solids formation occurred after 23 days at $-6.6°$ C.

Tests were also conducted to establish the effect of the stabilizers on rigid polyurethane foams produced from the stabilized polyisocyanate compositions. These tests established that the stabilized polyisocyanates will not detrimentally affect the polyurethane foams produced therefrom, even if the silicone compounds contain reactive hydroxyl groups capable of combining with the free —NCO group. A slight increase in viscosity was noticed without any resultant undesirable effects on the polyurethane produced.

EXAMPLE V 119 grams of polymethylene-polyphenylene polyisocyanate (equivalent weight 132, viscosity 200 centipoise at 25° C.) stabilized with 0.5 gram of "Dow Corning 193 Surfactant", were admixed with 100 grams of a propyleneoxide adduct of sucrose (hydroxyl number 409), 16 grams of o,o' - diethyl - N,N-bis(2-hydroxyethyl) aminomethylphosphate, 1.5 grams of N,N,N',N' - tetramethyl - 1,3-butanediamine and 25 grams of trichlorofluoromethane. The cream time, tack-free time, general appearance and cell structure was noted. For control, 119 grams of an unstabilized polyisocyanate were admixed with the above enumerated foam forming components, except that 2 grams of "Dow Corning 193 Surfactant" were added to the foaming components. The produced rigid polyurethane foam was identical in its physical properties and appearance with the foam prepared from the stabilized polyisocyanate composition.

EXAMPLE VI

Rigid polyurethane foam was prepared from a polyisocyanate according to the process described in Example V. The polyisocyanate was stabilized with 0.5 gram "Union Carbide L-5320" (1968). The produced foam was compared with a foam produced from unstabilized polyisocyanate and was found to be identical in appearance and physical properties.

Although the invention has been described in considerable detail for the purpose of illustration, it is to

What is claimed is:

1. A composition stabilized against solids formation at temperatures below 25° C., consisting essentially of a liquid, polymethylene-polyphenylene polyisocyanate and, intimately admixed therein, a stabilizing amount of an organo-silicone having the general formula of

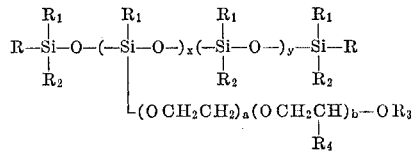

wherein R, $R_1$ and $R_2$ are selected from the group consisting of methyl, ethyl, propyl and phenyl; $R_3$ and $R_4$ are selected from the group consisting of hydrogen, methyl, ethyl, propyl and butyl; the

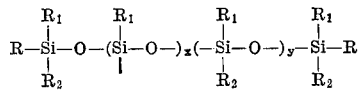

chain has an average molecular weight of from about 140 to about 5000; the

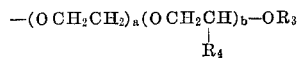

chain has an average molecular weight of from about 60 to about 3000; the integers $x$ and $y$ are whole numbers and at least 1; and the integers $a$ or $b$ are 0 or whole numbers, one of said $a$ and $b$ being at least 1.

2. A composition according to claim 1, wherein the stabilizing amount of organo-silicone is of from about 0.001 to about 5% by weight of the polyisocyanate.

3. A composition according to claim 1, wherein R, $R_1$, $R_2$, $R_3$ and $R_4$ are methyl.

4. A composition according to claim 1, wherein R, $R_1$, $R_2$ and $_4$ are methyl and $R_3$ is hydrogen.

5. A composition according to claim 1, wherein R, $R_1$, $R_2$ and $R_4$ are methyl and $R_3$ is butyl.

6. A composition according to claim 1, wherein $R_1$ is phenyl, R, $R_2$, $R_4$ are methyl and $R_3$ is hydrogen.

7. A composition according to claim 1, wherein $R_1$ is phenyl and R, $R_2$, $R_3$ and $R_4$ are methyl.

8. A composition according to claim 1, wherein $R_1$ and $R_2$ are phenyl and R, $R_3$, $R_4$ are methyl.

9. A process for preventing solids formation in liquid polymethylene-polyphenylene polyisocyanates at temperatures below 25° C., which comprises intimately admixing the polyisocyanate with a stabilizing amount of an organo-silicone having the general formula of

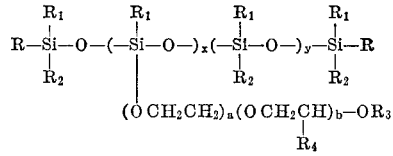

wherein R, $R_1$ and $R_2$ are selected from the group consisting of methyl, ethyl, propyl and phenyl; $R_3$ and $R_4$ are selected from the group consisting of hydrogen, methyl, ethyl, propyl and butyl, the

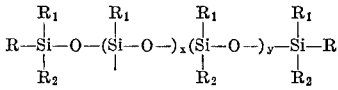

chain has an average molecular weight of from about 140 to about 5000; the

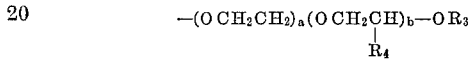

chain has an average molecular weight of from about 60 to about 3000; the integers $x$ and $y$ are whole numbers and at least 1; and the integers $a$ or $b$ are 0 or whole numbers, one of said $a$ and $b$ being at least 1.

10. Process according to claim 9, wherein the stabilizing amount of organo-silicone is of from about 0.001 to about 5% by weight of the polyisocyanate.

11. Process according to claim 9, wherein the stabilization is effected within a temperature range of from about 25° C. to about −20° C.

12. Process according to claim 9, wherein R, $R_1$, $R_2$, $R_3$ and $R_4$ are methyl.

13. Process according to claim 9, where R, $R_1$, $R_2$ and $R_4$ are methyl and $R_3$ is hydrogen.

14. Process according to claim 9, wherein R, $R_1$, $R_2$ and $R_4$ are methyl and $R_3$ is butyl.

15. Process according to claim 9, wherein $R_1$ is phenyl, R, $R_2$, $R_4$ are methyl, $R_3$ is hydrogen.

16. Process according to claim 9, wherein $R_1$ is phenyl and R, $R_2$, $R_3$ and $R_4$ are methyl.

17. Process according to claim 9, wherein $R_1$ and $R_2$ are phenyl, R, $R_3$ and $R_4$ are methyl.

References Cited

UNITED STATES PATENTS

| | | | |
|---|---|---|---|
| 2,835,692 | 5/1958 | Bloom et al. | 260—453 |
| 2,884,363 | 4/1959 | Bloom et al. | 260—453X |
| 3,274,225 | 9/1966 | Saunders et al. | 260—453 |

CHARLES B. PARKER, Primary Examiner

D. H. TORRENCE, Assistant Examiner

U.S. Cl. X.R.

260—2.5, 45.75, 448.2